3,413,270
POLYMERIZATION OF FORMALDEHYDE
Walter Ernest Heinz, New Providence, N.J., and Karl Frederick Kumli, Chico, Calif., assignors to Celanese Corporation, a corporation of Delaware
No Drawing. Continuation of application Ser. No. 514,701, Dec. 17, 1965. This application Oct. 31, 1967, Ser. No. 679,575
11 Claims. (Cl. 260—67)

ABSTRACT OF THE DISCLOSURE

Polymerizing formaldehyde by introducing formaldehyde vapors into a superjacent acetone vapor zone located above a liquid acetone reaction medium, whereby the formaldehyde vapors are entrained into the liquid acetone reaction medium and polymerized.

This invention relates to a novel process for polymerizing formaldehyde. It more particularly relates to such a process which is adapted to produce formaldehyde polymers of either low or high molecular weight as desired. This application is a continuation of U.S. application Ser. No. 514,701, filed Dec. 17, 1965, now abandoned which in turn is a continuation-in-part of U.S. application Ser. No. 226,141, filed Sept. 25, 1962, now abandoned.

Low molecular weight formaldehyde polymers, paraforms, are commercial products which are very useful as sources of formaldehyde. High molecular weight polymers of formaldehyde, polyoxymethylenes, are commercial products which are very useful as molding materials and as so-called "engineering plastic."

It is an object of this invention to provide a novel process for making formaldehyde polymers. It is another object of this invention to provide such a novel process in which formaldehyde can be controllably polymerized over a wide range of molecular weights. It is a further object of this invention to provide a novel process of purifying formaldehyde by polymerization thereof. Other and additional objects of this invention will become apparent from a consideration of the remainder of this specification wherein all proportions are in parts by weight unless specified to the contrary.

In accord with and fulfilling these objects, this invention involves a process for polymerizing formaldehyde, which process comprises contacting, in the presence of an appropriate catalyst, a vapor comprising formaldehyde with a liquid comprising acetone, and recovering the polymerized formaldehyde from a resulting acetone slurry thereof.

It is within the spirit and scope of this invention to use an aqueous formaldehyde solution as the source of feed material. Aqueous formaldehyde treated with acetone according to the process disclosed and claimed in U.S. application Ser. No. 69,296, filed Nov. 15, 1960, now abandoned in favor of continuation U.S. application Ser. No. 385,066, filed July 24, 1964, to replace at least about 95 weight percent of the water with acetone and form a solution of formaldehyde in acetone is suitable, which formaldehyde-acetone solution may contain up to about 5 weight percent water. In one preferred embodiment of this application, such an acetone dehydrating system operates by acetone extracting formaldehyde from an aqueous solution of formaldehyde while simultaneously fractionating out an acetone solution of formaldehyde. This dehydrating system operates by supplying liquid acetone to the top of a column and supplying a 20% aqueous formaldehyde solution to the middle of the column. The column is equipped with a reboiler and a partial condenser. The overhead vapors from the column pass through the partial condenser where a fraction containing acetone, formaldehyde, methanol and water stream is condensed and returned to the column as reflux. A vapor stream of acetone and formaldehyde which may contain some water, if desired, also leaves the partial condenser, which stream is very suitable as a feed for use in the polymerization process of this invention. Impurities are taken from the column as a side stream and a very dilute aqueous formaldehyde stream is taken off at the base of the column.

Because of the ready availability of this vapor stream of formaldehyde and acetone, the acetone being in the nature of an inert carrier, it is a very desirable source of reactant feed for the instant invention. Furthermore, since acetone does not form an azeotrope with water, it is possible and practical to form and use a vapor feed which is substantially anhydrous.

Where practical it is preferred to utilize an inert carrier, such as acetone, for the vaporous formaldehyde feed which is the same as the liquid reaction medium. In other words, it is preferred to take advantage of the desirability of an acetone reaction medium and the availability of an acetone solution of formaldehyde. An acetone medium is particularly desirable because acetone does not form an azeotrope with water and therefore the polymerization can be carried out under substantially anhydrous conditions as described below, if desired. It is also practical to control the amount of water in the reaction medium, if water is desired, in order to have control over the degree of polymerization of the formaldehyde and hence the molecular weight of the polymer product.

In one embodiment of this invention, a vigorously agitated acetone liquid medium containing up to about 5 weight percent water, based upon the weight of acetone, and a neutral salt, acid or basic catalyst is established as a reaction medium in a reaction zone, such as a reactor enclosed on at least three sides. By virtue of the agitation, vaporous acetone emanating from the body of liquid acetone is present above this body. Pursuant to a preferred embodiment of the present invention, formaldehyde vapor is introduced into the superjacent zone of vaporous acetone. Surprisingly enough, the formaldehyde is entrained into the liquid medium where it is admixed with both liquid acetone and the catalyst employed, conversion to solid polyformaldehyde then taking place.

When a vaporous inert carrier, such as acetone, is present with the formaldehyde vapor feed, e.g., of the type described hereinabove in conjunction with U.S. application Ser. No. 385,066, filed July 24, 1964, it has been found, quite significantly, that the formaldehyde vapor is selectively entrained into the liquid medium, the greater portion of the acetone feed vapor remaining in the superjacent vapor and eventually taken over with said superjacent vapor.

Still another advantage of the present invention, as opposed to a process wherein the formaldehyde vapor inlet feed system is submerged in the liquid acetone reaction medium, is the fact that polymerization at the point of inlet does not occur. On the other hand, when the inlet is submerged clogging of the whole system results by virtue of polymerization at the feed inlet point. Thus, the present invention is a very important contribution to the art for a number of reasons. A typical submerged feed inlet system is described in U.S. Patent 2,704,765, issued Mar. 22, 1955.

Typical catalysts employable in this invention: formic acid; acetic acid; boron trifluoride; metal halides, such as sodium iodide, lithium iodide, lithium fluoride, sodium fluoride, potassium fluoride, potassium iodide, magnesium iodide, magnesium fluoride, calcium iodide, calcium fluoride, strontium fluoride, strontium iodide, barium fluoride, barium iodide, tin chloride, zinc chloride and cadmium chloride; metal salts of organic acids, such as acetates to stearates, of lithium, sodium, potassium, magnesium, calcium, strontium and barium; tertiary amines, particularly trialkylamines such as tributyl amine, N-alkyl piperidines, N-alkyl pyrrolidines, N-alkyl morpholines and pyridine; quaternary ammonium salts, such as N-methyl pyridinium iodide, N-ethyl morpholine methiodide, trimethylammonium bromide and trimethylammonium iodide; quaternary phosphonium salts, such as tetraalkyl phosphonium iodides and bromides, tetraphenyl phosphonium iodides and bromides, and mixed alkyl-aryl phosphonium halides, e.g., triphenylmethylphosphonium iodide phosphines, particularly tertiary phosphines of the triaryl or trialkyl type including triphenyl phosphine or trimethyl phosphine; potassium hydroxide; and carbon dioxide.

It has been found, however, that while polymerization is promoted by both anionic and cationic catalysts, basic-type catalysts are preferred. While a proportion of catalyst ranging from 10 to 1,000 parts per million, based upon the weight of the acetone liquid reaction medium, can be used, from 50 to 100 parts per million is preferred for best results.

Still another unique advantage of the present invention is the fact that the molecular weight of the polymer product can be varied very considerably by simply varying the proportion of water admixed with the acetone liquid up to 5 weight percent, based upon the weight of the acetone liquid, i.e., the molecular weight decreases as the concentration of water increases. Surprisingly enough, therefore, the heretofore rigid requirement than an essentially non aqueous system be employed to produce high molecular weight polyoxymethylenes from formaldehyde has been handily overcome by virtue of the instant unique discovery.

It is preferred to employ from about 1 to about 3.75 weight percent of water in preparing paraform type polymers according to this invention, within which range it has been possible to obtain a formaldehyde assay as high as 95% in the paraform product. The liquid reaction medium in the embodiment wherein high molecular weight formaldehyde polymer (polyoxymethylene) is being produced, according to the present invention, is preferably substantially anhydrous. The term "substantially anhydrous" as used herein is intended to means less than about 1,000 parts water per million parts of liquid reaction medium. The formaldehyde feed vapor, however, whether low or high molecular weight polymer is desired, should be substantially anhydrous. This is quite different, neverthedless, from the essentially non-aqueous system heretofore mentioned wherein the presence of even very small amounts of water was deleterious.

In another embodiment of this invention, therefore, the entire reaction system is substantially anhydrous. Typical preferred suitable catalysts for this embodiment are: boron trifluoride; formic acid; quaternary phosphonium salts, such as triphenylmethylphonium iodide, tetraphenylphosphonium iodide and tetramethylphosphonium iodide; metal halides, such as zinc chloride, tert-butyoxy magnesium iodide, antimony fluorides, bismuth fluoride, aluminum iodide, titanium tetrachloride, manganese fluoride, nickel fluoride, zinc chloride, mercury chloride and phosphorous halides; quaternary ammonium salts, such as N-methyl pyridinium iodide, N-methyl pyridinium acetate and trimethylammonium bromide and iodide; or tertiary amines such as pyridine, N-alkyl piperidines; N-alkyl morpholines; N-alkyl pyrrolidines, and other trialkyl amines. The catalyst concentration suitably can vary between about 10 to 1,000 parts per million, preferably about 50 to 100, based upon the weight of acetone in the liquid.

In the embodiments set forth above, it is within the spirit and scope of this invention to provide the vapor as formaldehyde mixed with other inert diluents. Thus, the vapor may in some cases contain nitrogen, or the like; consequenlty, the diluent may or may not be the same as the main liquid component. It is convenient to employ a vapor stream having up to about 99.9% by weight of inert diluent. When present, the diluents are suitably present in a proportion below about 95 mole percent, preferably about 50 to 85 mole percent.

The reaction temperature according to this invention is suitably maintained between about 6° C. to about 56.5° C., preferably about 0° C. to about 30° C., optimum results being achieved between about 15° C. and about 20° C. This invention is operative at atmospheric, superatmospheric or subatmospheric pressures. Likewise, the invention may be conducted batch-wise or continuously.

The following examples are merely illustrative.

Example I

A one-liter, three necked flask was fiitted with an inlet tube, an exhaust tube and a mechanical stirrer. The flask was charged with 400 parts by weight of liquid substantially anhydrous acetone containing, based on liquid acetone, about 700 parts per million of water and 100 parts per million of tertiary-butoxy magnesium iodide catalyst. This charge was stirred vigorously while being maintained at a temperature between 12° C. and 18° C.,

TABLE I

| Run No. | Temp. (° C.) | Reaction Time (Hour) | Catalyst | Liquid Acetone—Water Content Thereof (Weight Percent) | Polymer Melting Point (° C.) | Inherent Viscosity [1] |
|---|---|---|---|---|---|---|
| 1 | 12-18 | 4.5 | Boron trifluoride | [2] An | 157-163 | 0.2 |
| 2 | 12-18 | 20.0 | Formic acid | An | 163-172 | 3.0 |
| 3 | 12-18 | 4.5 | Triphenyl methyl phosphonium iodide | An | 167-172 | 0.8 |
| 4 | 20-30 | 4.5 | Formic acid | An | 162-168 | 1.0 |
| 5 | 12-18 | 4.5 | t-Butyoxy magnesium iodide | An | 175-178 | 1.5-2.0 |
| 6 | 20-30 | 2.0 | Zinc chloride | An | 175-178 | 1.5-2.0 |
| 7 | 12-18 | 4.5 | N-methyl pyridinium iodide | An | 163-165 | 0.5 |
| 8 | 12-18 | 4.5 | N-methyl pyridinium acetate | An | 163-165 | 0.5 |
| 9 | 12-18 | 4.5 | Pyridine | An | 160-162 | 0.5 |
| 10 | 15-20 | 1.5 | Tributyl amine | 5.0 | 145-147 | [3] N.T. |
| 11 | 15-20 | 1.5 | ...do... | 3.75 | 137-140 | N.T. |
| 12 | 15-20 | 1.5 | Potassium acetate | 3.75 | 115-125 | N.T. |
| 13 | 15-20 | 1.5 | Formic acid | 0.5 | 174-176 | N.T. |
| 14 | 15-20 | 1.5 | Pyridine | 3.75 | 154-157 | N.T. |
| 15 | 15-20 | 1.5 | Potassium hydroxide | 3.75 | 122-127 | N.T. |
| 16 | 15-20 | 1.5 | Boron trifluoride | 3.75 | 100-120 | N.T. |
| 17 | 15-20 | 1.5 | ...do... | 0.5 | 115-120 | N.T. |
| 18 | 15-20 | 1.5 | N-ethyl morpholine methiodide | 2.5 | 120-125 | N.T. |
| 19 | 15-20 | 1.5 | N-methyl pyridinium iodide | 2.5 | 133-135 | N.T. |
| 20 | 15-20 | 1.5 | Carbon dioxide | 2.5 | 150-165 | N.T. |
| 21 | 15-20 | 1.5 | Sodium iodide | 2.5 | 105-110 | N.T. |

[1] The polymer inherent viscosity was measured at 60° C. in a 0.1% by weight solution of polymer in p-chlorophenol containing 2% by weight alpha-pinene.
[2] An=Substantially anhydrous, i.e., less than 1,000 parts H$_2$O per million parts liquid acetone.
[3] N.T.=Not tested.

a zone of vaporous acetone superjacent the agitated liquid reaction medium resulting. A 30 parts by weight per hour stream of substantially anhydrous formaldehyde (less than 1,000 parts H$_2$O per million parts of CH$_2$O) was, for a period of about 240 minutes, passed over the agitated liquid acetone but into the vaporous superjacent acetone zone. After 240 minutes, polymerized formaldehyde was recovered in the resulting acetone slurry. The yield was 67 parts by weight of polymer solids having a melting point of 175° C. to 178° C.

Several other polymerization runs carried out by the process of this invention are described in Table I, each of these runs being carried out essentially as in Example I, supra, except as shown in the table and except for the fact that in run 6 the feed per hour was 120 parts by weight of formaldehyde and in all other runs the feed per hour was 90 parts by weight.

Example II

A mixture of formaldehyde vapor (11 weight percent), acetone vapor (88.5 weight percent) and water vapor (0.5 weight percent) was fed to a stirred reactor at a rate of about 350 grams per hour, the reactor containing liquid acetone containing 100 parts catalyst per million parts acetone, this concentration being maintained by adding catalyst to the liquid acetone at a controlled rate. The resulting polymer was taken off as a slurry in acetone at the base of the reactor. The residence time in the reactor was approximately one hour. For the preparation of paraform, from 1 weight percent to 5 weight percent water, based on the liquid acetone reaction medium, was also added continuously. The reactor was jacketed with a water jacket and the temperature controlled with cooling water. The formaldehyde-acetone-water vapor feed was fed into the acetone vapor zone superjacent the vigorously stirred liquid acetone reaction medium in the reactor. The following runs (Table II) were carried out in this system under the specific conditions given:

TABLE II

| | Run Number | | | |
|---|---|---|---|---|
| | 22 | 23 | 24 | 25 |
| | Catalyst | | | |
| | Pyridine | N-methyl-pyridinium iodide | N-methyl-pyridinium iodide | Triphenyl phosphate |
| Catalyst conc., p.p.m. of liquid acetone | 100 | 100 | 100 | 100 |
| Water added, grams/hour | 12.5 | 12.5 | 25 | 12.5 |
| Temperature, ° C | 15-25 | 15-25 | 15-25 | 15-25 |
| Duration (hours) | 4 | 6 | 6 | 6 |
| Results: | | | | |
| Paraform, grams | 100 | 169 | 152 | 132 |
| Melting point, ° C | 139-143 | 137-140 | 128-132 | 141-144 |
| CH$_2$O assay, wt. percent | 94.2 | 94.9 | 94.4 | 95.2 |

It is also within the scope of this invention to utilize the formaldehyde vapor vented from one polymerization reactor as the feed to another polymerization reactor and to repeat this procedure until substantially all the formaldehyde has been polymerized.

It should be understood that the foregoing specification has been given by way of example and nothing contained therein should be construed as limiting on this invention, except insofar as recited in the appended claims.

Having described our invention what we desire to obtain by Letters Patent is:

We claim:
1. In a process for polymerizing formaldehyde wherein formaldehyde vapor is contacted with a liquid acetone reaction medium containing a formaldehyde polymerization catalyst, the improvement which comprises:
 (a) vigorously agitating the liquid acetone reaction medium to establish a superjacent acetone vapor zone, and
 (b) introducing the vaporous formaldehyde feed directly into the superjacent acetone vapor zone above the liquid acetone reaction medium whereby formaldehyde vapors are entrained into the liquid acetone reaction medium wherein the formaldehyde is polymerized.
2. The process of claim 1 wherein the vaporous formaldehyde is introduced in the form of vaporous mixture comprising formaldehyde and an inert carrier.
3. The process of claim 2 wherein the inert carrier is acetone.
4. The process of claim 2 wherein the vaporous mixture comprising formaldehyde and an inert carrier is substantially anhydrous.
5. The process of claim 4 wherein the liquid acetone reaction medium is substantially anhydrous and high molecular weight formaldehyde polymers are produced.
6. The process of claim 1 wherein the vaporous formaldehyde is introduced in the form of a vaporous mixture comprising formaldehyde and acetone and the formaldehyde vapors are selectively entrained into the liquid acetone reaction medium to the substantial exclusion of the acetone.
7. The process of claim 1 wherein the liquid acetone reaction medium contains up to 5 percent water.
8. The process of claim 1 wherein the liquid acetone reaction medium contains from about 1 to about 3.75 percent of water and low molecular weight formaldehyde polymer is produced.
9. The process of claim 1 wherein the polymerization catalyst is a basic catalyst.
10. The process of claim 1 wherein the catalyst concentration range is from 10 to 1000 parts per million, based upon the weight of the liquid acetone medium.
11. The process of claim 1 wherein the catalyst concentration range is from 50 to 100 parts per million, based upon the weight of the liquid acetone medium.

No references cited.

WILLIAM H. SHORT, *Primary Examiner.*

L. M. PHYNES, *Assistant Examiner.*